United States Patent [19]

Van Mal et al.

[11] 4,111,002
[45] Sep. 5, 1978

[54] CYCLIC DESORPTION REFRIGERATOR AND HEAT PUMP, RESPECTIVELY

[75] Inventors: Harmannus Hinderikus Van Mal; Eric Tapley Ferguson, both of Eindhoven, Netherlands

[73] Assignee: U.S. Philips Corporation, New York, N.Y.

[21] Appl. No.: 765,526

[22] Filed: Feb. 4, 1977

[30] Foreign Application Priority Data

Feb. 25, 1976 [NL] Netherlands .................. 7601906

[51] Int. Cl.² ..................... F25B 7/00; F25B 19/00
[52] U.S. Cl. ..................... 62/467 R; 62/335; 62/514 R
[58] Field of Search .................. 62/79, 269, 335, 112, 62/467, 514

[56] References Cited

U.S. PATENT DOCUMENTS

| | | | |
|---|---|---|---|
| 3,371,499 | 3/1968 | Hagenbach et al. | 62/269 |
| 3,397,549 | 8/1968 | Daunt | 62/79 |
| 3,633,373 | 1/1972 | Carbonell | 62/79 |
| 3,704,600 | 12/1972 | Prast et al. | 62/79 |
| 3,854,301 | 12/1974 | Cytryn | 62/467 |

*Primary Examiner*—Lloyd L. King
*Attorney, Agent, or Firm*—Frank R. Trifari; Rolf E. Schneider

[57] ABSTRACT

A cyclic desorption refrigerator and heat pump, respectively, having a plurality of thermodynamic units, each with a first and second chamber, the first chambers comprising the same sorbent and the second chambers comprising different sorbents, the heat of absorption released in a second chamber being used for desorption in an adjacent second chamber.

4 Claims, 5 Drawing Figures

CYCLIC DESORPTION REFRIGERATOR AND HEAT PUMP, RESPECTIVELY

The invention relates to a device for the transfer of thermal energy from a region of lower to a region of higher temperature by cyclic desorption comprising at least a thermodynamic unit having a first chamber in which a sorbent for a working medium is present, a first heat transfer device interruptibly communicating the first chamber with a place to be cooled, a second heat transfer device interruptibly communicating the first chamber with a place to be heated, a second chamber communicating with the first chamber via a communication duct, said second chamber comprising a sorbent which, at equal working medium pressure, sorbs working medium at a higher temperature level than the sorbent in the first chamber, the second chamber furthermore comprising a heat source and a third heat transfer device interruptibly communicating the second chamber with a heat absorber for supplying and withdrawing, respectively, working medium to and from, respectively, the first chamber by cyclic heating and cooling the sorbent in the second chamber.

Such devices comprise refrigerators and heat pumps.

A sorbent is to be understood to mean an agent which absorbs and/or adsorbs.

In a device of the kind described disclosed in German Patent Specification No. 549,343, the interruptible heat transfer devices consist of valve-controlled air ducts.

A disadvantage of the known device is its low thermal efficiency. This is due to the fact that the thermal energy, which, upon sorption of working medium by the sorbent in the second chamber is released at a comparatively high temperature, is spoiled.

It is the object of the present invention to provide a device of the kind described having an improved thermal efficiency.

For that purpose the device according to the invention is characterized in that two or more thermodynamic units are present of which the first chambers contain the same sorbent but of which the second chambers contain mutually different sorbents which, at equal working medium pressure, sorb mutually at different temperature levels, the second chambers being mutually arranged in an order of decreasing sorption temperature level, and that one of each pair of adjacent second chambers having the higher sorption temperature level, as a heat source for that one having the lower sorption temperature level, communicates interruptibly therewith via the third heat transfer device.

The thermal energy which is evolved upon sorption in the second chamber of one thermodynamic unit is advantageously used for desorption in the second chamber of the adjacent thermodynamic unit.

A favourable embodiment of the device according to the invention is characterized in that one or more regenerators are incorporated in each communication duct.

This provides a further improvement of the thermal efficiency of the device.

A further favourable embodiment of the device according to the invention is characterized in that the working medium is hydrogen and the first and second chambers comprise one or more of the compounds selected from the group of compounds of formula $AB_n$, where A is calcium or one or more rare earth metals, including Y, optionally combined with Th and/or Zr and/or Hf, where B is Ni and/or Co, optionally combined with Fe and/or Cu, and where $n$ has a value between approximately 3 and approximately 8.5.

The advantage of such compounds which are known per se, for example, from British Patent 1,291,976 is that they very rapidly absorb and desorb hydrogen and in addition have a very large sorption capacity.

Another favourable embodiment of the device according to the invention is characterized in that the working medium is hydrogen and the first and second chambers comprise one or more of the compounds selected from the group of compounds of formula $AD_m$, where A is one or more rare earth metals, including Y, and D is one or more metals from the group formed by Ni, Co or a mixture thereof with one or more of the elements Fe, Cu and Mn, and $m$ satisfies $1/3 \leq m < 3$.

The said compounds are proposed in Application Ser. No. 737,735 filed Nov. 1, 1976 and are comparable to the above-mentioned known compounds as regards their properties with respect to the absorption of hydrogen.

The invention will be described in greater detail with reference to the diagrammatic drawing which is not drawn to scale.

Figure 1A:
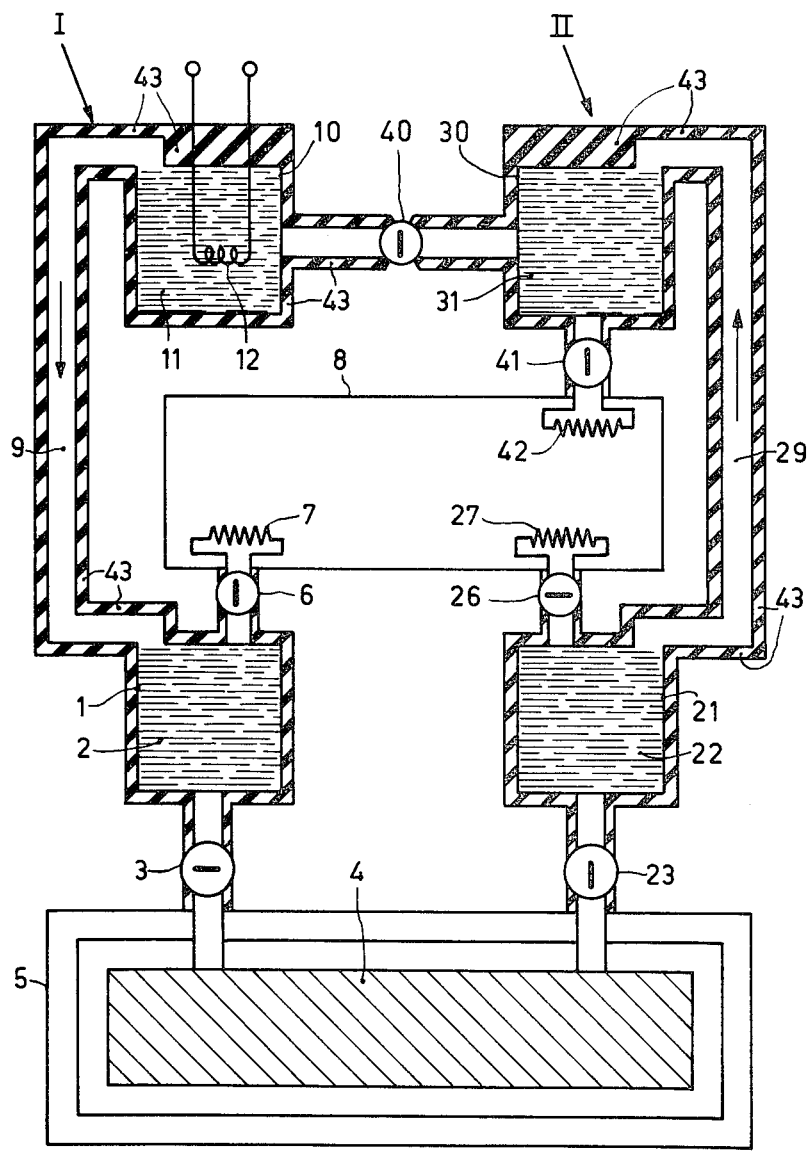
FIGS. 1a and 1b are longitudinal sectional views of an embodiment of a refrigerator having two thermodynamic units.
Figure 1B:
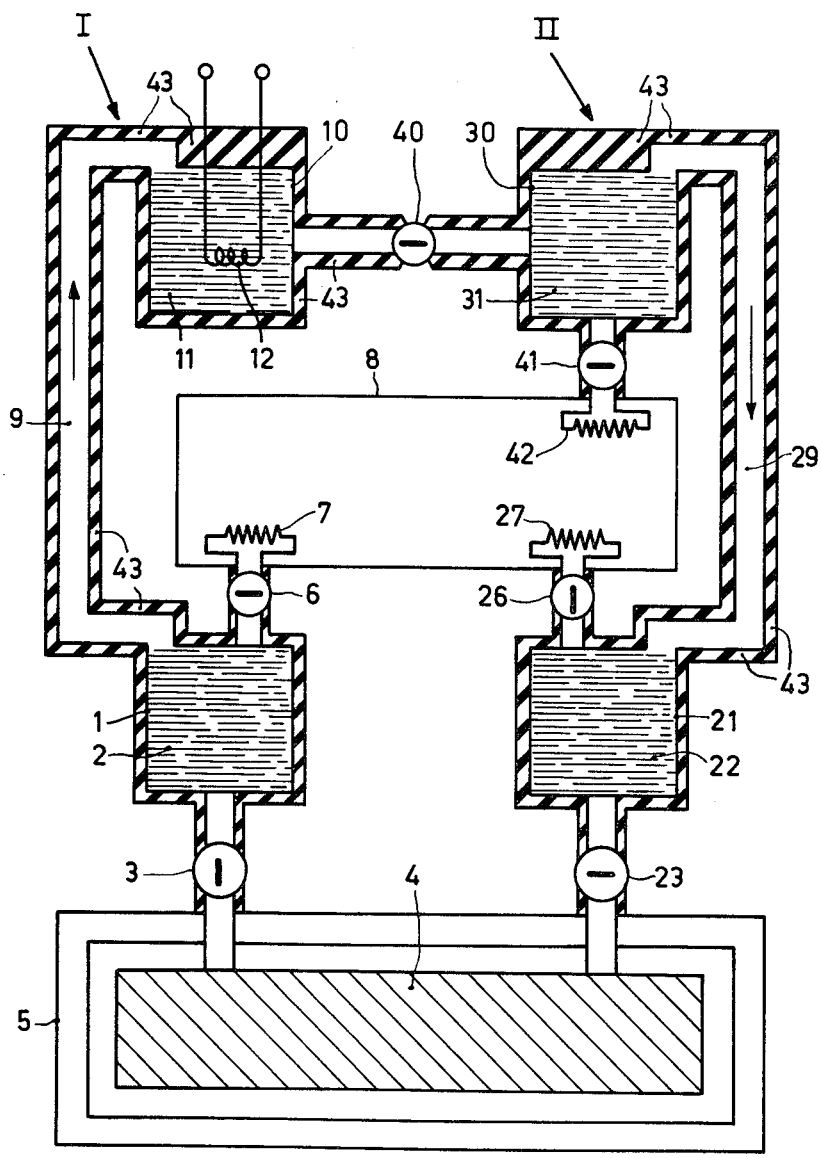

The refrigerator shown in FIGS. 1a and 1b has thermodynamic units referred to by reference numerals I and II.

Thermodynamic unit I comprises a first chamber 1 containing a sorbent 2. The first chamber 1 communicates, via a heat valve 3 as an interruptible heat transfer device, with an object 4 to be cooled which is arranged within a double-walled vacuum-isolated housing 5. Heat valves are known, for example, from United States Patent Specification No. 3,397,549.

The first chamber 1 furthermore communicates interruptibly, via a heat valve 6, with a radiator 7 arranged within a heat-absorbing space 8.

Finally the first chamber 1 communicates, via a communication duct 9, with a section chamber 10 containing a sorbent 11 as well as an electric heating element 12.

For components of the thermodynamic unit II which correspond to those of unit I the same reference numerals increased by the number 20 are used.

The second chamber 10 of unit I communicates interruptibly with the second chamber 30 of unit II via a heat valve 40 as a heat transfer device. The second chamber 30 furthermore communicates interruptibly with a radiator 42 within space 8 via a heat valve 41.

The thermodynamic units I and II comprise hydrogen as a working medium and are provided with thermal insulation 43.

The sorbents 2 and 22 are identical. As sorbents are present, for example, in the present case:

| sorbent |
|---|
| 2 = Nd Ni$_5$ |
| 11 = La Ni$_5$ |
| 22 = Nd Ni$_5$ |

| -continued |
| --- |
| sorbent |
| 31 = La Ni$_4$ Cu |

The operation of the device is as follows. By means of heater element 12, the LaNi$_2$ saturated with hydrogen present in chamber 10 of unit I is heated to 260° C. Hydrogen is then desorbed under an equilibrium pressure (that is the temperature-dependent hydrogen pressure above the hydride) of approximately 45 atm. Said hydrogen (FIG. 1a) flows via duct 9 to the NdNi$_5$ in chamber 1 and is absorbed hereby. The NdNi$_5$ assumes a temperature of 50° C corresponding to the equilibrium pressure of 45 atm. The released heat of reaction is delivered to space 8 via heat valve 6 and radiator 7. As is denoted by stripes in FIG. 1a, the heat valves 3 and 40 are closed during this part of the cycle.

Whereas in unit I hydrogen absorption takes place in chamber 1, hydrogen is desorbed in chamber 21 of unit II from the NdNi$_5$ present therein at a temperature of −19° C and a corresponding hydrogen pressure of 1 atm. The required heat of desorption is withdrawn from the object 4 to be cooled via heat valve 23.

Heat valve 26 is closed. The hydrogen released in chamber 21 flows through duct 29 to the LaNi$_4$Cu present in chamber 30 which compound absorbs said hydrogen at a temperature of 50° C. The released heat of absorption is delivered to space 8 via heat valve 41 and radiator 42.

When substantially all hydrogen has disappeared from the LaNi$_2$ in chamber 10 of unit I and from the NdNi$_5$ in chamber 21 of unit II, heater element 12 is switched off and the heat valves 3, 6, 23, 26, 40 and 41 are switched to the positions shown in FIG. 1b. The chambers 10 and 30 now communicate thermally with each other. The LaNi$_4$Cu in chamber 30 is now heated by the LaNi$_2$ in chamber 10. Due to the cooling of the LaNi$_2$ the hydrogen equilibrium pressure decreses there and the LaNi$_2$ begins to absorb hydrogen at a temperature of 150° C and a hydrogen pressure of 1 atm while giving off the heat of absorption to the LaNi$_4$Cu.

The hydrogen absorbed by the LaNi$_2$ in chamber 10 has been released in chamber 1 from the NdNi$_5$ which, at the equilibrium pressure of 1 atm, shows a temperature level of −19° C. The heat of desorption is withdrawn from the object 4 via heat valve 3. Heat valve 6 is closed.

Due to the heating of chamber 30 by means of chamber 10, hydrogen at a pressure of 45 atm is desorbed from the LaNi$_4$Cu of approximately 150° C in chamber 30 and is absorbed in chamber 21 by the NdNi$_5$ which assumes a temperature of 50° C. The heat of reaction released upon absorption is delivered to space 8 via heat valve 26 and radiator 27. Heat volva 23 is closed.

Figure 2:
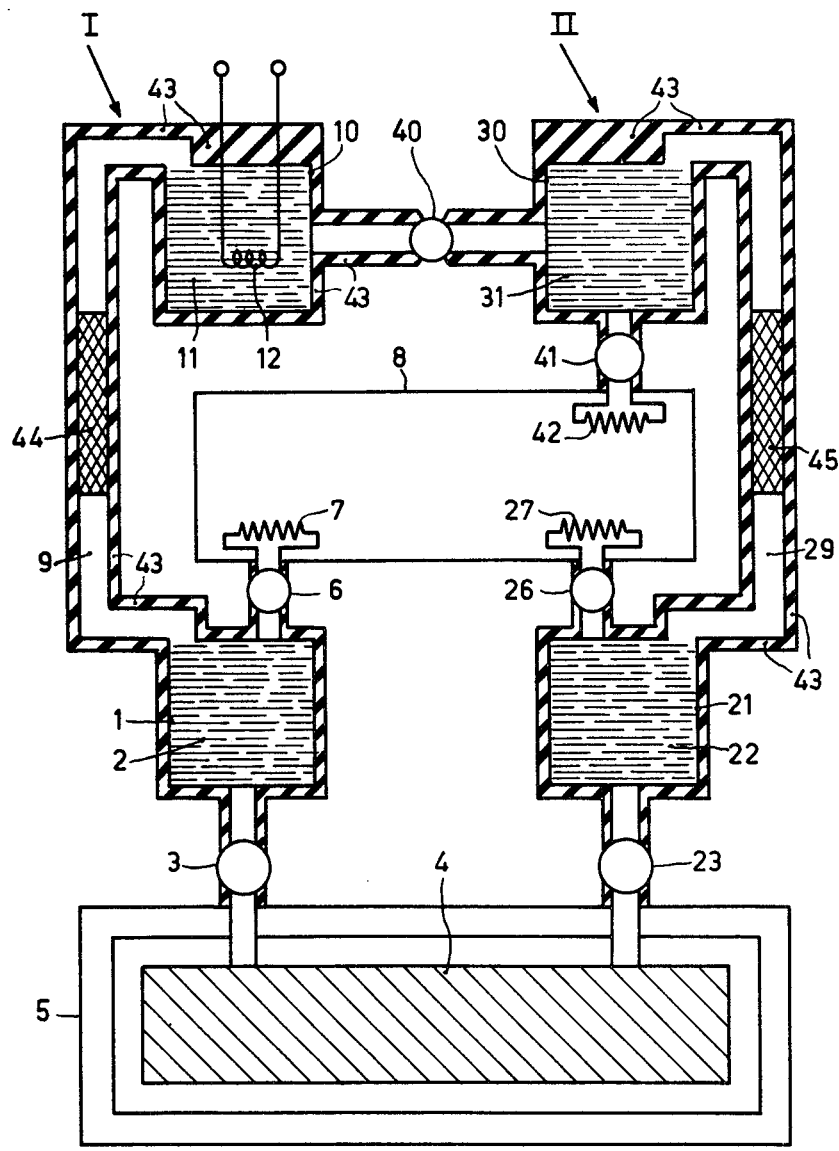
FIG. 2 is a longitudinal sectional view of the refrigerator shown in FIGS. 1a and 1b but having regenerators in the communication ducts between the chambers.

When substantially all the hydrogen has been desorbed from the NdNi$_5$ in chamber 1 of unit I and from the LaNi$_4$Cu in chamber 30 of unit II and has been absorbed by the LaNi$_2$ in chamber 10 of unit I and the NdNi$_5$ in chamber 21 of unit II, respectively, heater element 12 is switched on again and the heat valves 3, 6, 23, 26, 40 and 41 are again switched to the positions shown in FIG. 1a, so that the cycle can be repeated. For the refrigerator shown in FIG. 2 the same reference numerals are used as in FIGS. 1a and 1b.

A regenerator 44 is incorporated in the communication duct 9 and a regenerator 45 is incorporated in the communication duct 29.

When in unit I hydrogen of a higher temperature flows from chamber 10 to chamber 1 (FIG. 1a), thermal energy in regenerator 44 is delivered to the regenerator filling mass. When the hydrogen of lower temperature returns from chamber 1 to chamber 10 (FIG. 1b), said thermal energy is again absorbed by the hydrogen from the filling mass and contributes to the heating of chamber 30 of unit II.

For unit II it holds that in the phase shown in FIG. 1b the hydrogen delivers thermal energy to regenerator 45 and absorbs it herefrom again in the phase shown in FIG. 1a.

Figure 3A:
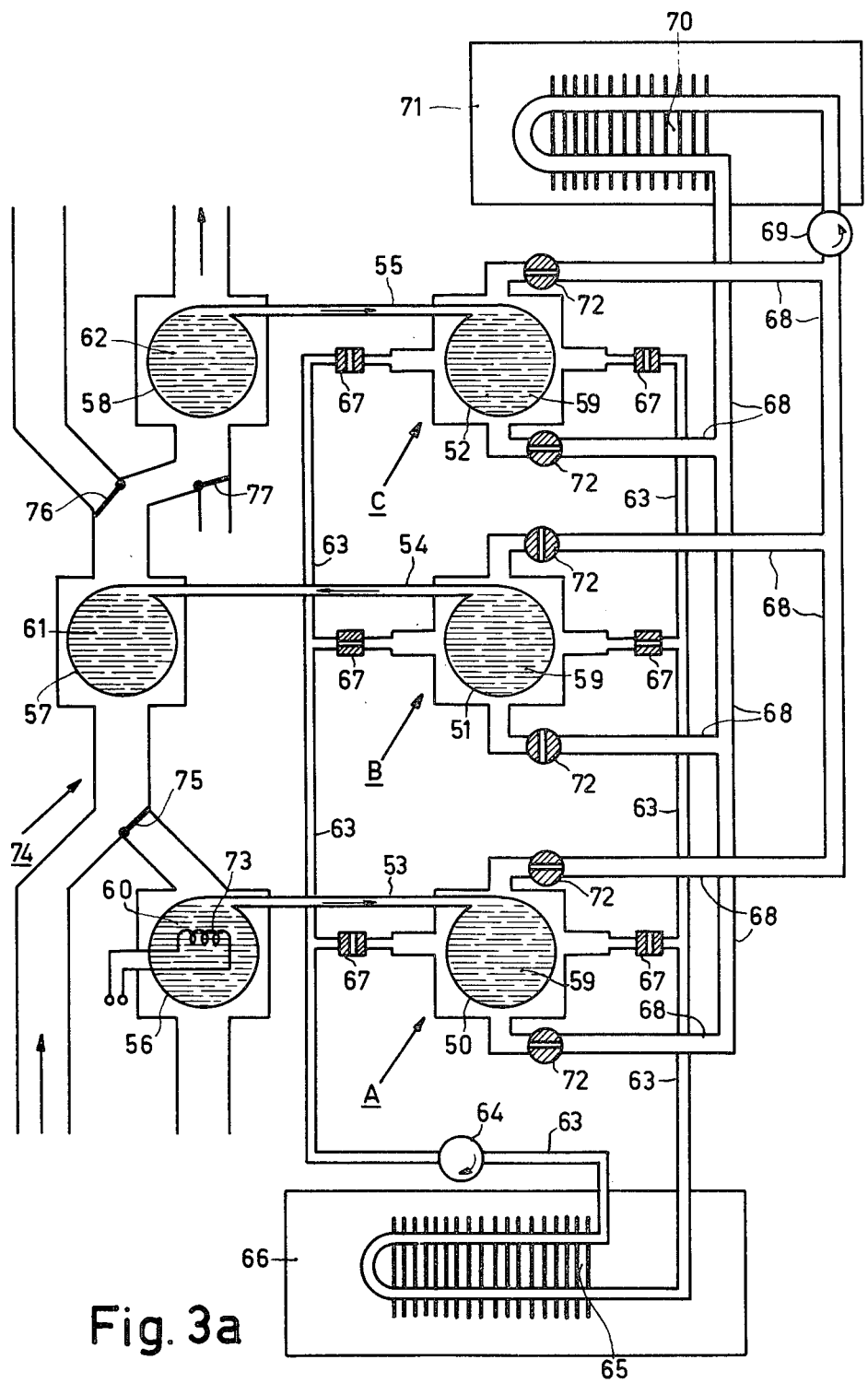
FIGS. 3a and 3b are longitudinal sectional views of an embodiment of a heat pump having three thermodynamic units.
Figure 3B:
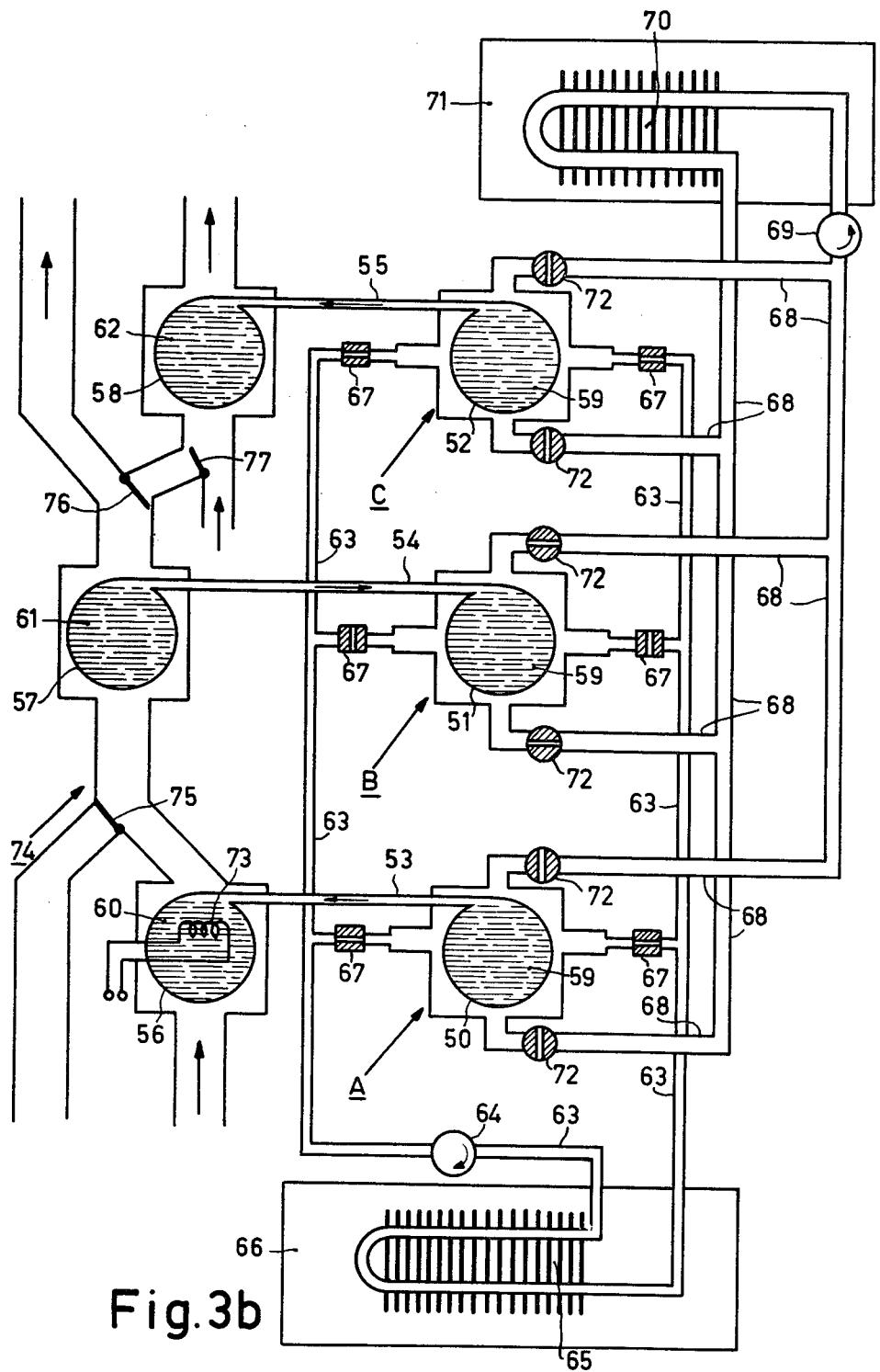

The heat pump shown in FIGS. 3a and 3b has three thermodynamic units A, B and C with associated first chambers 50, 51 and 52, respectively, which each communicate, via a communication duct 53, 54 and 55, respectively, with associated second chambers 56, 57 and 58, respectively.

The three first chambers comprise the same sorbent 59.

The second chambers 56, 57 and 58 comprise sorbents 60, 61 and 62, respectively.

On the one hand, the first chambers 50, 51 and 52, arranged mutually in parallel, are incorporated in a first system of ducts 63 which furthermore comprises a heat transfer medium, for example oil, a pump 64 for circulating the heat transfer medium, a heat exchanger 65 for withdrawing thermal energy from a space 66, as well as cocks 67.

On the other hand the first chambers 50, 51 and 52 in parallel arrangement are incorporated in a second system of ducts 68 which also comprises a heat transfer medium, a pump 69, a heat exchanger 70 for delivering thermal energy to a space 71, as well as cocks 72.

The second chamber 56 of unit A has an electric heater element 73.

The second chambers 56, 57 and 58 are incorporated in a system of ducts 74 for air as a heat transfer medium, shown only partly, in which system valves 75, 76 and 77 are incorporated.

The thermodynamic units A, B and C again comprise hydrogen as a working medium, while, for example, the following combination of sorbents is used:

| | Sorbent | Operating temperature between approximately | |
| --- | --- | --- | --- |
| 59 | La$_{0.8}$Y$_{0.2}$Ni$_{5.2}$ | 0° C | 40° C |
| 60 | LaNi$_2$ | 140° C | 195° C |
| 61 | LaCo$_5$ | 85° C | 140° C |
| 62 | LaCo$_{1.2}$Ni$_{3.8}$ | 40° C | 85° C |

Associated with the lower operating temperature of the sorbents is a hydrogen equilibrium pressure of 1 atm and associated with the higher operating temperature is an equilibrium pressure of 12 atm.

The operation of the device is furthermore as follows.

In the operating condition shown in FIG. 3a sorbent 60 is maintained at a temperature of approximately 195° C by heater element 73, so that hydrogen is expelled herefrom, flows to chamber 50 and is absorbed there by sorbent 59 at a temperature of approximately 40° C while giving off the released heat of absorption to the circulating transfer medium in the system of ducts 68. In the same manner, desorption of hydrogen from sorbent 62 in chamber 58 takes place at approximately 85° C and absorption by sorbent 59 in chamber 52 at approximately 40° C, while giving off the released heat of absorption to the circulating transfer medium in the system of ducts 68.

The transfer medium in system of ducts 68 delivers the thermal energy absorbed from chambers 50 and 52 in heat exchanger 70 to the space 71.

The heat of desorption required for chamber 58 in this part of the cycle originates from chamber 57 in which sorbent 61 just absorbs hydrogen at a temperature of approximately 85° C while giving off the released heat of absorption to the air flowing along.

The hydrogen absorbed by sorbent 61 is desorbed from sorbent 59 in chamber 51 at a temperature of approximately 0° C. The heat of desorption has been withdrawn from space 66 by sorbent 59 via the transfer medium circulating in the system of ducts 63 and the heat exchanger 65.

In the next part of the cycle, heater element 73 has been switched off and the valves 75, 76 and 77 as well as the cocks 67 and 72 are in the positions shown in FIG. 3*b*.

Hydrogen absorption takes place in the second chambers 56 and 58 at approximately 140° C and approximately 85° C, respectively, while desorption takes place in the second chamber 57 at approximately 140° C, the required heat of desorption being provided by the chamber 56.

The heat of absorption released in chamber 58 may be supplied, for example, to space 71 or be otherwise made useful.

The heat of desorption required in the present part of the cycle for the first chambers 50 and 52 is withdrawn from space 66 via the system of ducts 63 in heat exchanger 65 (desorption temperature approximately 0° C).

At the same time, the heat of absorption evolved in first chamber 51 is delivered to space 71 via the system of ducts 68 and heat exchanger 70.

Of course all kinds of other embodiments are possible.

Instead of an electrical heater element 73, any heat source may be used, (for example, a burner, the solar energy collected by a solar collector, etc).

What is claimed is:

1. In a device for the transfer of thermal energy from a region of lower to a region of higher temperature by cyclic desorption, said device comprising at least two thermodynamic units each having a first chamber in which a sorbent for a working medium is present, a first heat transfer device interruptibly communicating the first chamber with a place to be cooled, a second heat transfer device interruptibly communicating the first chamber with a place to be heated, a second chamber communicating with the first chamber via a communication duct, said second chamber comprising a sorbent which, at equal working medium pressure, sorbs working medium at a higher temperature level than the sorbent in the first chamber, the second chamber furthermore comprising a heat source and a third heat transfer device communicating interruptibly the second chamber with a heat absorber for supplying and withdrawing, respectively, working medium to and from, respectively, the first chamber by cyclic heating and cooling the sorbent in the second chamber, the improvement wherein the first chambers of the thermodynamic units comprise the same sorbent but the second chambers of which comprise mutually different sorbents which, at equal working medium pressure, mutually sorb at different temperature levels, the second chambers being mutually arranged in an order of decreasing sorption temperature level, and wherein one of each pair of adjacent second chambers having the higher sorption temperature level, as a heat source for that one having the lower sorption temperature level, communicates interruptibly therewith via the third heat transfer device.

2. A device as claimed in claim 1, characterized in that one or more regenerators are incorporated in each communication duct.

3. A device as claimed in claim 1, characterized in that the working medium is hydrogen and the first and second chambers comprise one or more of the compounds selected from the group of compounds of formula $AB_n$, where A is calcium or one or more rare earth metals, including Y, optionally combined with Th and/or Zr and/or Hf, where B is Ni and/or Co, optionally combined with Fe and/or Cu, and where $n$ has a value between approximately 3 and approximately 8.5.

4. A device as claimed in claim 1, characterized in that the working medium is hydrogen, and the first and second chambers comprise one or more of the compounds selected from the group of compounds of formula $AD_m$, where A is one or more rare earth metals, including Y, and D is one or more metals from the group formed by Ni, Co or a mixture thereof with one or more of the elements Fe, Cu and Mn, and $m$ satisfies $1/3 \leq m < 3$.

* * * * *